United States Patent [19]

Schroeder et al.

[11] 3,922,291
[45] Nov. 25, 1975

[54] 22-DEHYDRO-HOMOCHOLENIC ACID

[75] Inventors: Collin H. Schroeder; Richard J. Lechnir; Philip H. Derse, all of Madison, Wis.

[73] Assignee: Wisconsin Alumni Research Foundation, Madison, Wis.

[22] Filed: Feb. 14, 1974

[21] Appl. No.: 442,458

[52] U.S. Cl. .......................................... 260/397.1
[51] Int. Cl.² ........................................ C07J 00/00
[58] Field of Search ............................... 260/397.1

[56] References Cited
UNITED STATES PATENTS
3,786,062  1/1974  Schroeder et al. ............... 260/397.2

Primary Examiner—Elbert L. Roberts
Attorney, Agent, or Firm—Howard W. Bremer

[57] ABSTRACT

22-Dehydrohomocholenic acid and process for preparing the same. 22-dehydrohomocholenic acid finds application as an intermediate in the preparation of 22-dehydro-25-hydroxycholecalciferol and exhibits antibacterial properties.

2 Claims, No Drawings

22-DEHYDRO-HOMOCHOLENIC ACID

This invention relates to a new synthetic steroid acid.

More particularly, this invention relates to 22-dehydrochomocholenic acid and to a method for preparing the same.

22-Dehydrohomocholenic acid ($\Delta^{22}$-homocholenic acid) was prepared from readily available 3β-acetoxy-22,23-bisnorcholenaldehyde (see T. C. McMorris, J. Org. Chem. 35, 458 (1970) by reacting that aldehyde with the phosphonium ylid prepared from 2-carboxyethyltriphenyl phosphonium bromide (see D. B. Denney and L. C. Smith, J. Org. Chem., 27, 3404 (1962) to yield cis-trans $\Delta^{22}$-homocholenic acid.

A detailed description of the method of preparation of $\Delta^{22}$-homocholenic acid is set forth below.

$\Delta^{22}$-homocholenic acid Preparation

A solution consisting of 5.2 g. (14 mmoles) of 3β-acetoxy-22,23-bisnorcholenaldehyde (I) and 7.5 g. (18 mmoles) of 2-carboxyethyltriphenyl phosphonium bromide in 80 ml. of dry dimethylsulfoxide-toluene (1:1) solution was cooled to about 5°C. and added rapidly to a well stirred chilled suspension (ice bath) of 1.04 g. (43.3 mmoles) of sodium hydride in 10 ml. of dry toluene. The addition and subsequent reaction were carried out under dry nitrogen. The reaction mixture was stirred for 16 hours at room temperature. After decomposing the excess sodium hydride with a small amount of methanol the reaction mixture was poured into water. The crude product was removed by benzene extraction which was washed successively with water and saturated sodium chloride solution and then dried over anhydrous sodium sulfate.

The majority of the triphenylphosphine oxide was removed by solvent partition. The crude product was dissolved in 140 ml. methanol containing 20 ml. of 5% aqueous sodium hydroxide. The solution was first mixed with 200 ml. of diethyl ether and then 200 ml. water. The ether layer was discarded and the aqueous methanol solution washed additionally with 2–200 ml. portions of the ether. The alkaline solution was diluted with 300 ml. of water and acidified with 25 ml. of 20% sulfuric acid. The crude product was recovered by ether extraction. The product was purified by crystallization from methanol. The yield was about 80% based on the starting aldehyde. The infrared spectrum (KBr) of the material had carbonyl absorbance at 5.88μ and was otherwise commensurate with the assigned structure. No absorbance due to acetoxy was present.

Analysis. Calcd. for $C_{25}H_{38}O_3$ (percent): C, 77.67; H, 9.91. Found (percent): C, 78.08; H, 10.14.

The molecular weight, 386, was verified by mass spectral analysis. GLC analysis indicated the presence of both $\Delta^{22}$cis-and trans-isomers in a ratio of about 1:4.

It is to be understood that in the foregoing procedure butyl lithium can be substituted for the sodium hydride with equivalent results. Other reactants considered in the art to be equivalent to either sodium hydride or butyl lithium in this type of reaction can also, of course, be used.

The $\Delta^{22}$-homocholenic acid product obtained in the above procedure is a key intermediate in the preparation of 22-dehydro-25-hydroxycholecalciferol, a vitamin D derivative, which exhibits significant antirachitic characteristics. Conversion of this key intermediate into 22-dehydro-25-hydroxycholecalciferol is shown in detail in U.S. Pat. No. 3,786,062, issued Jan. 15, 1974, the disclosure of which is to be considered incorporated herein by reference.

In addition to its application as an intermediate in the preparation of 22-dehydro-25-hydroxycholecalciferol $\Delta^{22}$-homocholenic acid has been found to exhibit antimicrobial activity against certain organisms as set forth in the following example.

EXAMPLE I

Filter paper discs (Schleicher and Schuell, No. 740-E) were dipped in methanol solutions of $\Delta^{22}$-homocholenic acid of varying concentrations (concentrations indicated in following Table), drained and air dried. No attempt was made to quantificate the amount of $\Delta^{22}$-homocholenic acid on each disc. The thus impregnated discs were placed on the surface of agar plates containing the test organism indicated in the Table. The plates were incubated with the discs in place and the zones of growth inhibition measured with measurements listed in the Table including the disc diameter of 12.7 mm.

TABLE I

Antimicrobial Activity of $\Delta^{22}$-Homocholenic Acid

| Organism | Zone of Inhibition (diameter) at Several Concentrations | | | | |
|---|---|---|---|---|---|
| | 1040 μg/ml | 104 μg/ml | 10.4 μg/ml | 1.04 μg/ml | Negative control |
| Bacillus Cereus (spores) | 17.8 | 17.4 | 13.5 | Negative | Negative |
| | 17.6 | 17.3 | 13.6 | Negative | Negative |
| Bacillus Subtilis (spores) | Negative | Negative | Negative | Negative | Negative |
| Micrococcus Flavus | 17.5 | 16.4 | Negative | Negative | Negative |
| | 17.6 | 16.4 | Negative | Negative | Negative |
| | 17.6 | 16.4 | Negative | Negative | Negative |
| Sarcina Lutea | 18.1 | 17.6 | Negative | Negative | Negative |
| | 17.9 | 17.2 | Negative | Negative | Negative |
| | 17.5 | 17.2 | Negative | Negative | Negative |
| Saccharomycea Cerevisiac Y-30 | 20.6 | 19.4 | 15.4 | Negative | Negative |
| | 19.8 | 19.8 | 16.1 | Negative | Negative |
| | 21.0 | 20.4 | 16.6 | Negative | Negative |

It is evident from the data in the above Table that $\Delta^{22}$-homocholenic acid showed definite growth inhibition of some of the test organisms suggesting its use as an antimicrobial agent. It should be understood, however, that the procedure used is not a potency measurement but a test designed to show relative effective inhibition concentrations for a specific compound. No potency comparisons can be made from these results since the test is based on the extent and rate of diffusion of a particular compound in a particular medium without the aid of a carrier solvent, and since the rate of diffusion of a substance will, of course, vary greatly due to the nature of the material being tested, i.e. its polarity, nature of the functional groups, molecular size, etc.

Having thus described the invention what is claimed is:

1. 22-dehydrohomocholenic acid.
2. A method for preparing 22-dehydrohomocholenic acid which comprises admixing 3β-acetoxy-22,23-bisnorcholenaldehyde and 2-carboxy-ethyltriphenyl phosphonium bromide reacting the admixture with sodium hydride at ice bath temperatures in an inert atmosphere and decomposing excess sodium hydride after the reaction is complete and recovering 22-dehydrohomocholenic acid from the reaction mixture.

* * * * *